United States Patent [19]

van den Beld

[11] 4,165,104

[45] Aug. 21, 1979

[54] SEALED JOINT PIPE CONNECTION

[75] Inventor: Paul C. H. van den Beld, Hardenberg, Netherlands

[73] Assignee: Wavin B.V., Zwolle, Netherlands

[21] Appl. No.: 642,342

[22] Filed: Dec. 19, 1975

Related U.S. Application Data

[63] Continuation-in-part of Ser. No. 464,685, Apr. 26, 1974, abandoned.

[30] Foreign Application Priority Data

Apr. 27, 1973 [NL] Netherlands .................. 7305985

[51] Int. Cl.² ............................................. F16L 47/00
[52] U.S. Cl. .................................... 285/21; 285/24; 285/292; 285/423; 156/294
[58] Field of Search ............... 285/21, 22, 24, DIG. 20, 285/DIG. 16, 294, 297, 292, 291, 423; 403/508; 264/262; 156/294, 73.1; 29/200 P

[56] References Cited

U.S. PATENT DOCUMENTS

| | | | |
|---|---|---|---|
| 1,214,985 | 2/1917 | Barber | 403/350 X |
| 1,866,857 | 7/1932 | Lindquist | 285/297 X |
| 2,379,990 | 7/1945 | Rembert | 285/423 X |
| 2,933,428 | 4/1960 | Mueller | 285/21 X |
| 2,942,748 | 6/1960 | Anderson | 156/73.1 |
| 3,788,928 | 1/1974 | Wise | 285/21 X |
| 3,917,497 | 11/1975 | Stickler | 285/21 X |

*Primary Examiner*—Andrew V. Kundrat
*Attorney, Agent, or Firm*—Edmund M. Jaskiewicz

[57] ABSTRACT

A heat sealed or welded pipe connection for thermoplastic pipes comprises a male pipe part which is sealed to the inner surface of a female pipe part, said female pipe part carrying centering abutment projections on its outer surface. The female pipe part may consist of a socket which starting from its openings has an outer circumference with an increasing size, the outside radius of curvature of the socket is 6 to 12 times the outside diameter of the male pipe part and the total length of the socket is equal to the outside diameter of the male pipe part.

5 Claims, 8 Drawing Figures

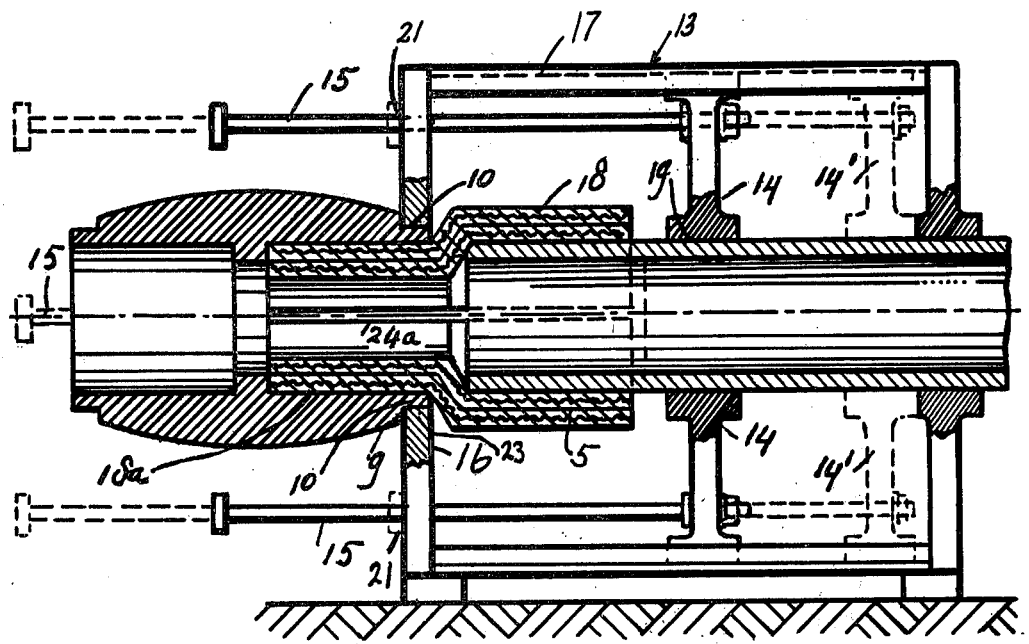
FIG: 7a.
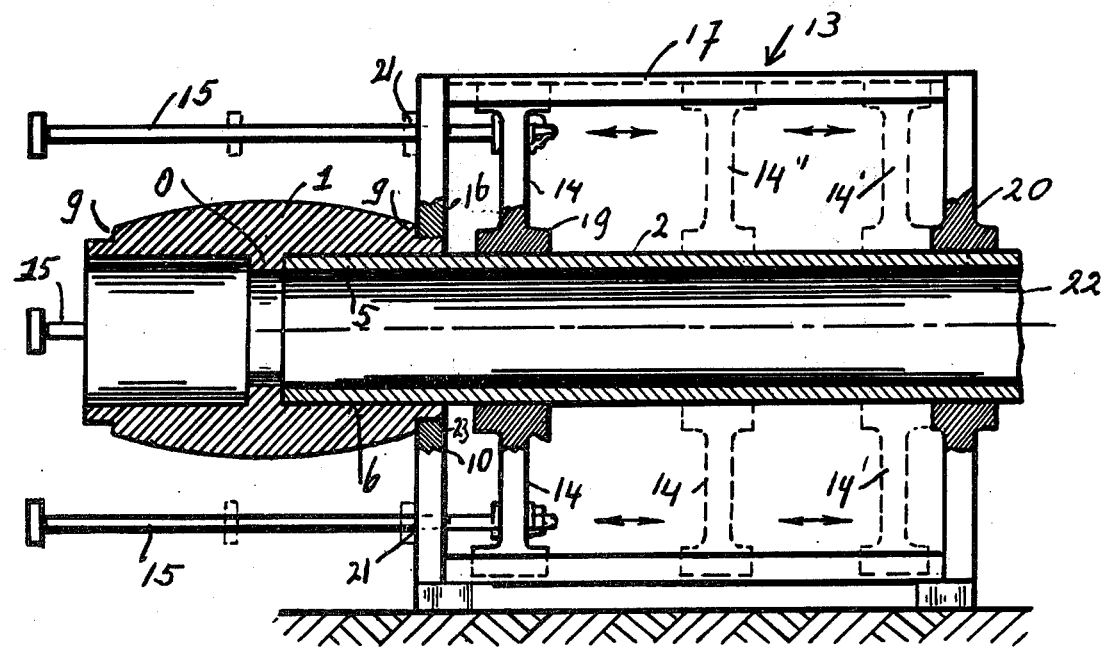
FIG: 7b.

SEALED JOINT PIPE CONNECTION

RELATED APPLICATION

This application is a continuation-in-part of the copending application Ser. No. 464,685 filed Apr. 26, 1974, now abandoned by the same named applicant.

BACKGROUND OF THE INVENTION

The invention relates to a heat sealed pipe connection, comprising at least one female pipe part of thermoplastics material and a male pipe part which is sealed to the inner side of the female pipe part.

Pipe connections in which a male pipe part of polyethylene is sealed to the inner side of a female pipe part are known in the art. In order to obtain a proper sealed joint the male pipe part should be slid into the female pipe part in a centered position. Therefore devices are required, provided with gripping means with a centered position relative to the female pipe part. On using auxiliary parts made of synthetic material with a rather small length and/or an outer diameter increasing from the opening, such a device cannot be applied because the gripping means are not able to absorb the force produced by the sealing pressure against the female pipe part and/or cannot hold the female pipe part in a centered position when the male pipe part is inserted. Such auxiliary equipment must then be manually connected and a lot of skill is required to obtain a well centered insertion. Operational safety requires that the sealed joint should be subsequently tested which causes an undesired increase of the manufacturing cost.

SUMMARY OF THE INVENTION

The object of the invention is to provide a sealed pipe connection of the aforementioned type which overcomes the aforementioned disadvantages and wherein a proper centering of the sealing members relative to the female pipe part is always ensured.

The present invention comprises a pipe connection wherein a male pipe part of thermoplastic material is heat sealed or welded within the interior of a female pipe part of thermoplastic material. Such sealed connections are generally made by heating the outer surface of the male pipe part and the inner surface of the female pipe part to a temperature which will melt the thermoplastic material. As these plastic surfaces are melted, the male pipe part is pushed into the interior of the female pipe part to connect both parts by a layer of heat sealed material. In order to obtain a proper seal it is necessary that the female pipe part be securely held in a position wherein it is properly aligned and centered with respect to the male pipe part. When the female pipe part comprises a socket which is of a relatively small size or diameter it becomes difficult to grip properly the socket to enable the male pipe part to be pushed therein and to be centered during the sealing operation. This problem becomes more pronounced when the outer surface of the socket is curved. Another disadvantage is that the socket may be damaged when it is gripped by some form of a retaining or aligning apparatus.

According to this invention, proper gripping and centering of the male and female pipe parts is obtained by providing the female pipe part with an annular abutment or shoulder which is perpendicular to the longitudinal axis of the pipe part and against which the gripping or securing apparatus is positioned. Further, the bearing surface between the abutment and the closest opening of the female pipe part may be provided with helical threads or annular ridges to provide a suitable gripping or engaging surface.

The centering abutment projections or abutment edge adjoin advantageously either the bearing surfaces extending in the longitudinal direction of the pipe which may be a cylindrical surface or a truncated conical surface. A truncated conical surface preferably has its greatest outer circumference at the location of the opening of the female pipe part.

It has been found that in practice it is advisable to provide that the bearing surfaces or the cylindrical or truncated conical surface extend as far as the nearest opening of the female pipe part.

In order to fix the sealing members, the bearing surfaces of the cylindrical, truncated conical surface, respectively may be provided with a preferably helical profile to permit the sealing member being screwed on the female pipe part. It is obviously also possible to provide transversely extending ridges whereby the sealing member can be excellently disposed e.g. by means of two clamps on the outside of the female pipe part.

Preferably the female and male pipe part consist of polyolefines like homo- and copolymers of ethylene, propene, butene and higher olefines.

THE DRAWINGS

FIG. 7a represents a male pipe and a female polyethylene pipe part with heating means before making the joint;

FIG. 7b represents a male pipe and a female pipe part in the centering means.

DESCRIPTION OF THE PREFERRED EMBODIMENTS

Figure 1:
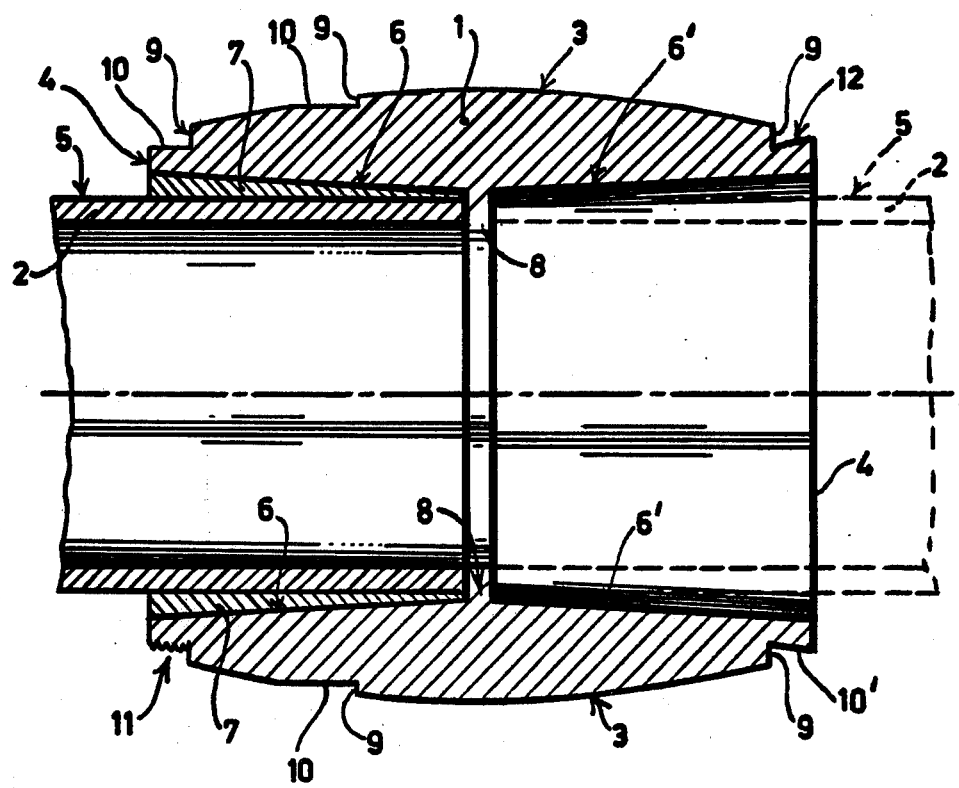
FIG. 1 shows a longitudinal section through a pipe connection according to the present invention with a female pipe part consisting of a double socket, while the abutment-centering surfaces at the two ends are differently shaped.

In FIG. 1 there is shown a sealed joint pipe connection comprising a female pipe part in the shape of a double socket 1 and a male pipe part 2 both made of polyethylene. The outside 5 of the male pipe part 2 and the inside 6 of the female pipe part, in the shape of the double socket 1, which is opposite the surface 5, are interconnected by means of a molten layer sealed connection 7. In order to ensure a correct extent of insertion of male pipe part 2 relative to the female pipe part, the double socket 1 is on its inside provided with a central inner abutment collar 8.

So as to allow a well centered insertion of the male pipe part 2 into the female part 1 sealing members should be placed on the outside of the male pipe part 2 at a desired distance from the opening.

To achieve the latter the female pipe part has on its outside centering abutment projections 9, which in the present case constitute an abutment edge. The abutment faces of the centering abutment projections, the abutment edge 9, respectively are substantially perpendicular to the longitudinal axis of the male pipe part in order to ensure a still better centering.

In order to ensure a proper placement of the sealing members on the outside of e.g., female pipe part, the outer circumference 3 of which increases towards the center cylindrical bearing surfaces 10, extending in the longitudinal direction of the pipe, adjoin the centering abutment edges 9, respectively. Also, a truncated conical bearing surface 10' can be used. The truncated conical surface 10' preferably has its greatest outer circumference at the location of the opening 4 of the female pipe part.

The bearing surfaces 10, 10' are advantageously provided with helical ridges 11, or transverse ridges 12, whereby the helically extending ridges 11 permit the sealing member to be screwed on the bearing surface until it abuts against the abutment edge 9.

When a truncated conical bearing surface is used it is obviously impossible to screw the sealing member and it is then clamped on the truncated conical bearing surface 10'. Preferably transverse ridges 12 are provided on this bearing surface in order to hold the sealing member properly in position.

The double socket 1 has advantageously a curved outer shape with a radius of curvature ranging from 6 to 12 times, preferably from 8 to 10 times, the outer diameter of the male pipe part 2, the total length of the double socket being equal to the outer diameter of the male pipe part.

This relationship has been found to be very advantageous for the manufacture of such a socket by injection moulding, since shrinkage produces all kinds of variations of the final product.

By selecting these relationships, in injection moulding a double socket can possibly be obtained in which the conical shape of the two opposite orifices 4 does not change with respect to the conical shape of the cones and the distance between the orifices is selected so as to be equal to the outer diameter of the male pipe part.

The inner surfaces 6', 6 of the socket are frusto-conical. The generatrices of the frusto conical surfaces making an angle ranging from 0° to 2.5° preferably 1° to 2.5° with the longitudinal axis of the pipe part while the frusto-conical surface has its greatest outer circumference at the location of the opening 4. In this manner an excellent sealed joint can be obtained when the male pipe part 2 is slid into the female pipe part 1.

The beaing surface 10' may, as has been mentioned, also have a truncated conical construction, the greatest outer circumference thereof being at the location of the opening 4. In this way stresses produced by the sealing pressure on the female pipe part are absorbed.

As is shown in the drawing the bearing surfaces 10 extend between the abutment edge 9 and the openings of the female pipe part. It is obvious that this is not a necessity. It is possible to provide an abutment edge 9a at a greater distance from the opening 4' and the bearing surface 10a may end at a distance from the orifice 4' as shown in FIG. 1.

Figure 2:
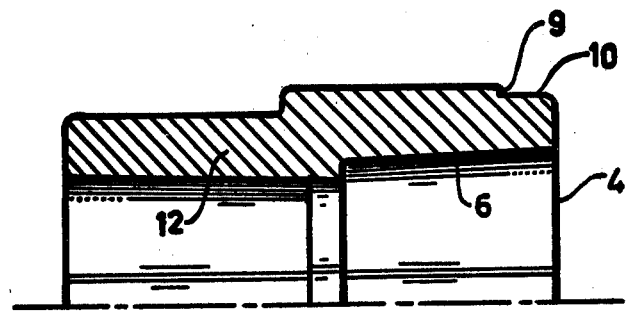
FIG. 2 shows a reducer.

In FIG. 2 is shown a reducer 12 which can serve as a female pipe part. This female pipe part 12 is again provided with an abutment edge 9 and a cylindrically extending bearing surface 10 which extends to the vicinity of the orifice 4 of the female pipe part.

Figure 3:
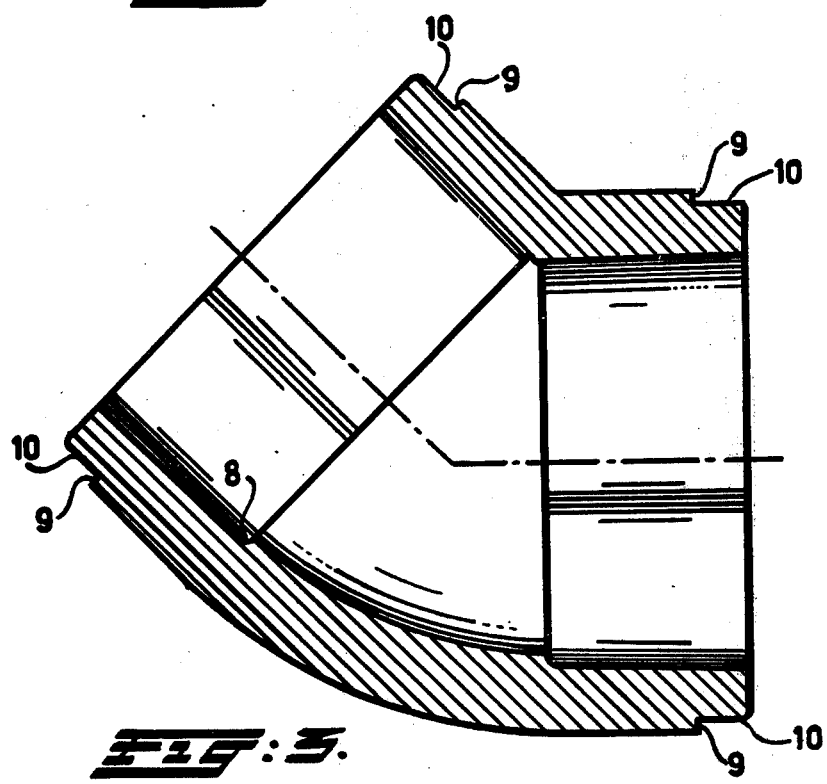
FIG. 3 shows a bend.

In the bend according to FIG. 3 the abutment edge 9 is at some distance from the orifice and the free end of the cylindrical bearing surface 10 ends at the opening 4.

Figure 4:
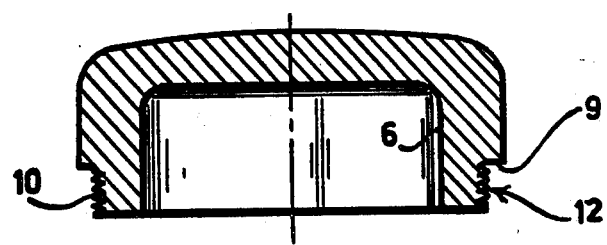
FIG. 4 represents a sealing hood.

The sealing hood represented in FIG. 4 is provided with an abutment edge 9 with a bearing surface 10' which has transverse ridges 12 for securing the sealing members.

Figure 5:
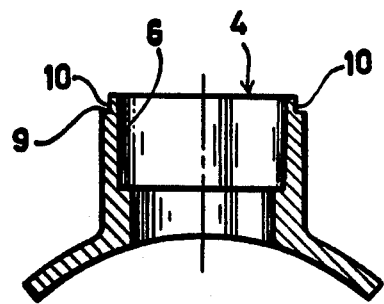
FIG. 5 represents a branch piece.

The branch piece shown in FIG. 5 may also be a saddle member with an abutment edge 9 in the vicinity of the orifice, while a truncated conical surface 10 extending from the orifice as far as the abutment edge 9 adjoins the latter.

Figure 6:
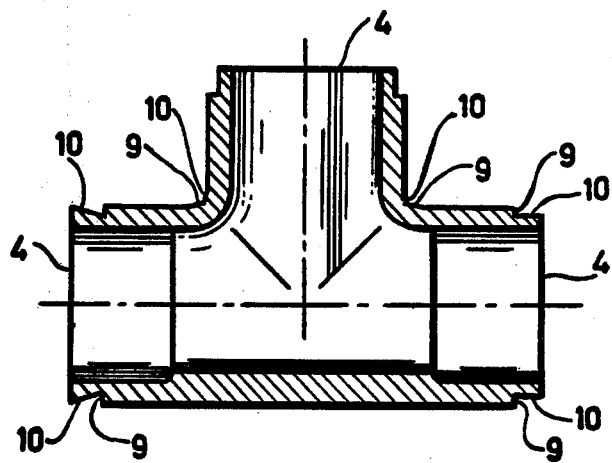
FIG. 6 represents a T-piece.

The T-piece as shown in FIG. 6 is at various locations provided with abutment edges 9 and cylindrical bearing surfaces 10, truncated conically extending bearing faces 10', respectively. Some cylindrical bearing surfaces end at some distance from the abutment edges.

The pipe connection according to the invention is obtained as shown in FIGS. 7a and 7b.

FIG. 7a shows how the heating and pipe introducing device 13 engages the centering abutment plane 9, so that the male pipe part 2 is exactly centered in relation to the inner side of the muff 1.

In a first stage the muff 1 is pushed against the outer side of front plate 16 and gripping means 14 are moved into the position indicated as 14'. The gripping means 14 now grip the male pipe part 2. Before moving gripping means 14 from the position 14' to the left as shown in the drawing, the heating cylinder part 18a is pushed into the inner side of muff 1 and then the male pipe part 2 is pushed unto the inner side of heating cylinder part 18 being integral with heating cylinder part 18a. The polyethylene material of muff 1 and of male pipe part 2 is now heated to e.g. 215° C. so that the surface layers facing the heating cylinders will melt. Evidently the cylinder comprising parts 18,18a consist of two halves 24a,24 for a more easy handling and removal of the heating means.

The second stage comprises the return of gripping means 14 to the position 14' and removal of heating means 18,18a.

The third stage is the introduction of male pipe part 2 into the muff 1. This is accomplished by moving gripping means 14 from position 14' to 14" and then to the drawn position as shown in FIG. 7b.

For moving the pipe part 2 the clamping means are connected with drawing rod 15 and guided through opening 21 in front plate 16.

On the other hand rear plate 20 is provided with a guiding opening or ring 22 leaving a small clearance for the male pipe part 2.

For exerting a sufficient pressure between muff 1 and male pipe part 2 the edge 23 of front plate 16 is first brought to engage the outer side of muff 1 clampingly after having pushed the front side of front plate 16 against the centering abutment plane 9. Then the drawing rod 15 moves clamping means 14 towards the front plate 16 and this situation is maintained until the previously melted inner side of the muff 1 and the outer side of the male pipe part 2 are sealed to each other. Clamping engagement is obtained by the means generally known in the art. During their movement the clamping means 14 are guided in rail 17.

It will be noted that the length of the cylindrical part 10 is e.g. 10 mm and extends from the end of the muff. In this way less cracking in heatsealing according to the invention are observed.

It will be understood that this invention is susceptible to modification in order to adapt it to different usages and conditions, and accordingly, it is desired to comprehend such modifications within this invention as may fall within the scope of the appended claims.

What is claimed is:

1. A heat sealed pipe connection for pipe parts of a synthetic thermoplastic material particularly polyethylene and polypropylene comprising at least one female pipe part and a male pipe part which is sealed to the inside of the female pipe part by pushing the male pipe part through an end opening into the female pipe part in a non-rotative way, said female pipe part having adjacent its ends annular centering abutment projections on its outside surface, the abutment surfaces of the centering projections being substantially perpendicular to the longitudinal axis of the female pipe part and each centering projection constituting a continuous abutment surface to facilitate gripping of the female pipe part to align the male and female pipe parts, said centering abutment projections adjoin cylindrical bearing surfaces extending in the longitudinal direction of the female pipe part and said cylindrical bearing surfaces extend as far as the nearest opening of the female pipe part, the end of said male pipe part sealed to the female pipe part being inwardly of said abutment projections with respect to the end opening.

2. A pipe connection as in claim 1 wherein said bearing surfaces have a profile on their outside comprising one of transversely and helically extending ridges.

3. A pipe connection as in claim 1 wherein the centering abutment projections adjoin truncated conical bearing surfaces extending in the longitudinal direction of the female pipe part, said truncated conical surface having its greatest outer diameter at the location of the opening of the female pipe part into which the male pipe part is inserted.

4. A pipe connection according to claim 1 wherein the female pipe part consists of a double socket with an inner abutment collar, the double socket, starting from its opening has an outer circumference with an increasing size, while the outside radius of curvature of the double socket is 6 to 12 times the outside diameter of the male pipe part and the total length of the double socket is equal to the outside diameter of the male pipe part.

5. A pipe connection according to claim 1, wherin the inside of the female pipe part starting from its opening extends truncated conically, the greatest diameter of the truncated cone being at the location of the opening and the generatrix makes an angle ranging from 0° to 2.5° with the female pipe part.

* * * * *